United States Patent
Wakimoto et al.

[11] 3,726,594
[45] Apr. 10, 1973

[54] IMAGE POSITIONING OPTICAL ARRANGEMENT IN PROJECTION PRINTING SYSTEM

[75] Inventors: Zenji Wakimoto, Ohta-ku, Tokyo; Yasushi Matsui, Kawasaki-shi, Kanagawa-ken, both of Japan

[73] Assignee: Nippon Kogaku K.K., Tokyo, Japan

[22] Filed: Dec. 9, 1971

[21] Appl. No.: 206,300

[52] U.S. Cl. .....................356/138, 350/91, 356/241, 356/165, 353/66
[51] Int. Cl. ...........................G01c 1/00, G01b 11/26
[58] Field of Search...........................353/65, 66, 67; 350/91, 81; 356/138, 241, 165, 166, 167

[56] References Cited

UNITED STATES PATENTS

| | | | |
|---|---|---|---|
| 3,484,150 | 12/1969 | Taoka et al. | 356/138 |
| 3,563,665 | 2/1971 | Takahashi et al. | 356/120 |
| 3,571,748 | 3/1971 | Koester et al. | 331/94.5 |

*Primary Examiner*—Ronald L. Wibert
*Attorney*—Joseph M. Fitzpatrick et al.

[57] ABSTRACT

In the projection printing system of the type in which the image of an original plate formed with a pattern is projected for printing on a photosensitive plate through a projection lens system, an image positioning optical arrangement comprises a projection lens providing an optical image forming system, and a semitransparent mirror obliquely disposed at an afocal position in the optical image forming system so that illuminating light incident on the photosensitive plate is emergent therefrom perpendicularly or substantially perpendicularly thereto. A light source or an image of light source is disposed at or near a position corresponding to the focal point of an optical system interposed between the photosensitive plate and the semitransparent mirror so that the image on the photosensitive plate may be focused on the original plate. A position adjusting microscope is disposed behind the original plate for viewing a formed image therethrough.

1 Claim, 8 Drawing Figures

$$C = d\sin\theta \left\{ 1 - \frac{\cos\theta}{\sqrt{n^2 - \sin^2\theta}} \right\}$$

(a)

(b)

IMAGE POSITIONING OPTICAL ARRANGEMENT IN PROJECTION PRINTING SYSTEM

BACKGROUND OF THE INVENTION

1. Field of the Invention

This invention relates to an image positioning optical arrangement for adjusting the relative position of a photosensitive plate and an original plate formed with a photosensitive layer thereon in the projection printing system.

2. Description of the Prior Art

An integrated circuit is formed of different substances of different shapes laminated in layers upon a crystalline lamina. Since the shapes of these substances are extremely minute and complex, a system whereby minute images are printed on a crystalline sheet by the use of the photographic technique has been adopted in the manufacture of integrated circuits. More specifically, an integrated circuit is manufactured by photographically printing minute patterns on a crystalline lamina coated with photosensitive emulsion and subjecting such lamina to a certain chemical treatment.

There are two types of image printing systems, i.e. the contact printing system and the projection printing system. In the conventional contact printing system, the image printing is accomplished by bringing a photographic negative known as a photomask into intimate contact with a crystalline lamina coated with photosensitive emulsion and exposing the back surface thereof to light. Such procedures must be repeated several times, and this gives rise to the necessity that a pattern to be newly printed must be registered with a pattern previously formed on the lamina. For this purpose, an optical system for adjusting the position of a photosensitive plate has been adopted which employs, as shown in FIG. 1 of the accompanying drawings a photosensitive plate 1 formed with the photosensitive layer thereon, an original plate 2 formed with the pattern to be printed onto the photosensitive layer of the photosensitive plate, a pair of microscopes including objective lenses 3, semitransparent mirrors 4, condenser lenses 5, illuminators 6 and lenses forming the optical image forming systems of the microscopes. Since the original plate 2 must be moved to have its position adjusted, the photosensitive plate 1 is disposed in a desired spaced apart relationship with respect to the original plate 2. Thus, if the position adjusting microscopes have a sufficient depth of focus to contain the spacing therein, the positioning of the original plate may be effected by viewing the surfaces of the photosensitive plate and the original plate at the same time. However, a greater depth of focus presupposes a lower magnification of the microscopes which unavoidably leads to insufficient accuracy of registration between the photosensitive plate and the original plate. Conversely, a higher magnification for a higher accuracy of registration will involve a smaller depth of focus which in turn will require the original plate to be positioned by focusing the microscopes to the surface of the photosensitive plate and to the surface of the original plate, alternately. This renders the positioning difficult to do. Or, even if the positioning has been achieved perfectly at all, the surface of the photosensitive layer and the surface of the original plate must be brought into complete intimate contact to avoid a blurred print just before they are exposed to light. Such intimate contact would often tend to cause misregistration between the photosensitive plate and the original plate, and thus the above-described procedures require a great deal of experience or skill on the part of the operator. A further serious problem is that separation of the photosensitive plate from the original plate during their intimate contact, or after exposure to light, is likely to impart fatal damages thereto and, accordingly, reduce the yield of integrated circuits, as well as greatly increase the waste of the original plate.

On the other hand, a projection printing system which uses a projection lens to form the image of the original plate on the photosensitive plate can avoid damage of the surface of the photosensitive layer and the waste of the original plate because the original plate and the photosensitive plate are separated from each other, although this system requires the projection lens to be of high performance. Such an advantage of the projection printing system contributes to an increased yield of end products and a lower cost of manufacture. Furthermore, the positional adjustment may be achieved simply by registering the image of the original plate with the photosensitive plate or the image of the photosensitive plate with the original plate, and thus the positional adjustment can be effected in the same plane.

This, in turn, leads to the elimination of the need to increase the depth of focus of the microscope and permits the use of a microscope having a high magnification, which also results in an enhanced accuracy of registration between the original plate and the photosensitive plate. Moreover, once the registration is attained, exposure can be effected in that state without the likelihood of any positional misregistration being caused. In this way, the projection printing system is free of such disadvantages as experienced in the contact printing system and has various positive advantages.

In the projection printing system, however, the position adjustment of the image to be printed is indispensable and a suitable positioning means must be incorporated in the optical path of the projection lens. Various types of such positioning means have been proposed, but the most desirable is the type which will never hamper the performance of the projection lens and can attain a high accuracy of registration. Various types of image positioning optical systems used in conventional projection printing are shown in FIGS. 2, 3 and 5. The type shown in FIG. 2 employs a photosensitive plate 1, an original plate 2, a projection lens 7, a condenser lens 8 and a light source 9 for printing and illumination. Semitransparent mirrors $M_1$ and $M_2$ and microscopic systems M and M' are provided to form photosensitive plate positioning optical systems, as indicated by the broken lines. In this example, the semitransparent mirror $M_1$ or $M_2$ is disposed obliquely in the optical image forming system so that the photosensitive plate 1, having the image of the original plate 2 projected thereon through the projection lens 7, may be optically directed laterally of the image forming system and viewed through the microscope M or M' for positional adjustment. The light source 9 serves both for printing and illumination.

If the system $M_1$–M, with the semitransparent mirror $M_1$ interposed between the photosensitive plate 1 and the projection lens 7, is in use, the working distance of the microscope M will be limited to reduce the magnification thereof, whereas the use of the system $M_2$–$M'$, with the semitransparent mirror $M_2$ interposed between the projection lens 7 and the original plate 2, will bring about an advantage that the working distance of the microscope $M'$ will not be limited and, thereby, increase the magnification thereof. However, the semitransparent mirror $M_1$ in the system $M_2$–$M'$ must be larger in size than the semitransparent mirror $M_1$ in the system $M_1$–M. Another known arrangement employs a photosensitive plate, a projection lens and an original plate arranged to form an optical image forming system having a straight optic axis, and further includes a position adjusting microscope disposed behind the original plate, so that illuminating light is projected from between the photosensitive plate and the projection lens or between the projection lens and the original plate or from within the position adjusting microscope. Such an arrangement is shown in FIG. 3, where the photosensitive plate is designated by 1, the projection lens by 7, the original plate by 2, and the position adjusting microscope by M. As seen, the image of the photosensitive plate 1 may be projected through the projection lens 7 onto the original plate 2, behind which is located the position adjusting microscope M. As indicated by broken lines, semitransparent mirror $M_1$, $M_2$ and $M_3$ and illuminating optical system $L_1$, $L_2$ or $L_3$ are provided to constitute individual illuminating system $M_1$–$L_1$, $M_2$–$L_2$ or $M_3$–$L_3$ disposed at respective predetermined positions for illuminating the photosensitive plate 1. Although the semitransparent mirror $M_1$ or $M_2$ is inclined in the optical image forming system as in the case of FIG. 2, they are intended to direct light from the light sources disposed laterally of the optical image forming system to the surface of the photosensitive plate and not to direct the image forming light laterally. The arrangement of FIG. 3 is adapted to project the image of the photosensitive plate upon the original plate through the projection lens and effect the positional adjustment by the use of the position adjusting microscope M.

In both projection printing systems of FIGS. 2 and 3, variation occurs in image forming performance because of the presence of the semitransparent mirrors disposed in the optical path of the projection lens. In other words, a formed image is deviated in position and shifts in the image plane and the aberrations become irregular. As shown in FIG. 4, it is generally assumed that a plate having flat parallel sides whose refractive index is $n$ and whose thickness is $d$ permits light to be incident thereon at an angle of incidence $\theta$ and then pass therethrough. Then the optical path deviation $c$ and the optical path difference $\delta$ occurring between the incident light and the emergent light will be expressed as:

$$c = d \sin \theta \left\{ 1 - \frac{\cos \theta}{\sqrt{n^2 - \sin^2 \theta}} \right\} \quad (1)$$

$$\delta = \frac{nd}{\sqrt{n^2 - \sin^2 \theta}} + c \tan \theta - \frac{d}{\cos \theta} \quad (2)$$

Hence, if the semitransparent mirror is disposed at non-afocal position in the image forming system as shown at $M_1$ or $M_2$ in FIGS. 2 and 3, the position of the formed image will be deviated and the formed image will shift in the image plane. Also, the aberrations will become irregular for a non-afocal light beam because the values of $c$ and $\delta$ are variable with the angle of incidence $\theta$.

In equations (1) and (2) above, smaller values of $c$ and $\delta$ may be obtained by decreasing the thickness $d$ of the semitransparent mirror, but the minimum value of $d$ is limited to maintain the accuracy of such mirror. For example, where $n = 1.5168$, $d = 0.01$mm and $\theta = 45°$, the optical path deviation $c$ and the optical path difference $\delta$ are given as $c = 0.0033$mm and $\delta = 0.0005$mm by equations (1) and (2). This means that even if a semitransparent mirror of good accuracy, having a thickness of $10\mu$, is used, such as the mirror $M_1$ or $M_2$ in FIGS. 2 and 3, and disposed at an angle of inclination of 45°, there will occur an image shift of $3.3\mu$ and an image positional deviation of $0.5\mu$ in case of paraxial image. In the illuminating system $L_3$–$M_3$ of FIG. 3, which includes a semitransparent mirror $M_3$ disposed obliquely in the position adjusting microscope M so as to direct light from the laterally positioned light source to the photosensitive plate 1, the disadvantages as presented by the aforesaid semitransparent mirror $M_1$ or $M_2$ may be obviated, but this arrangement still has a disadvantage that the light is partly reflected by the surface of the original plate 2 to reduce the contrast of the image to be viewed.

A further example of the known projection printing system, including a position adjusting microscopic optical system disposed behind the original plate, is arranged so that light is projected from between a photosensitive plate and a projection lens or between the projection lens and the original plate. In such a system, the optic axis of the optical image forming system is not straight and the semitransparent mirror therefore is adapted to serve as a surface reflection mirror in the optical image forming system. Such an optical arrangement is shown in FIG. 5, wherein numerals 1, 2 and 7 designate the photosensitive plate, original plate and projection lens, respectively. As in the arrangement of FIG. 3, the image of the photosensitive plate 1 is projected upon the original plate 2 through the projection lens 7 and viewed for position adjustment through a position adjusting microscope M disposed above the original plate 2. An illuminating optical system $L_1$ and $L_2$ and a semitransparent or surface reflection mirror $M_1$ or $M_2$ are combined together to illuminate the photosensitive plate 1. Although the semitransparent mirror $M_1$ or $M_2$ is disposed in the optical image forming system, the image forming light is provided by the light reflected on the surface of the semitransparent mirror and this obviates occurrence of the optical path deviation and difference noted above with respect to the projection printing system of FIG 2 or 3. The light from either illuminating system may be used to illuminate the surface of the photosensitive plate 1 and the image projected thereon through the projection lens 7 may be viewed on the original plate through the position adjusting microscope M to enable position adjustment. When the light from the illuminating optical system $L_1$ is used as the illuminating light, $M_1$ may be a semitransparent mirror and $M_2$ may be a surface reflection mirror. When the light from the illuminating optical system $L_2$ is used as the illuminating light, $M_1$ may be a surface reflection mirror and $M_2$ may be a semitransparent mirror. Because the surface reflection mirror only serves to bend the optical path, it may be eliminated so that light may be directed rectilinearly without causing any inconvenience. The present system is meritorious in that the performance of the projection lens can be fully utilized if only the accuracy and positional adjustment of the semitransparent and surface reflection mirrors are ensured. Actually, however, positioning these mirrors to bend the optical path involves substantial difficulty and, moreover, lower accuracy and defective positioning of these mirrors would tend to disturb the performance of the image forming lens.

To separate the viewing light and the photographing light from each other, a dichroic mirror is adopted as a semitransparent mirror, but such mirror causes irregular intensity of illumination due to its different angle characteristics, unless the projection lens is telecentric. Another disadvantage of the present system lies in the limited back focus of the projection lens for bending the optical path by means of the semitransparent or surface reflection mirror $M_1$ or $M_2$.

SUMMARY OF THE INVENTION

It is an object of the present invention to provide an optical system for adjusting the position of a formed image which eliminates all of the foregoing disadvantages existing in the prior art.

According to the present invention, there is provided, in a projection printing system in which the image of a negative is projected for printing on a printing sheet through a projection lens, an image positioning optical arrangement which comprises a projection lens providing an optical image forming system, a semitransparent mirror obliquely disposed at an afocal position in the optical image forming system so that illuminating light incident on the printing sheet is emergent therefrom perpendicularly or substantially perpendicularly thereto, a light source or an image of light source disposed at or near a position corresponding to the focal point of an optical system interposed between the printing sheet and the semitransparent mirror so that the image on the photosensitive plate may be focused on the original plate, and a position adjusting microscope disposed behind the original plate.

The above object and other features of the present invention will become fully apparent from the following description of an embodiment thereof taken in conjunction with the accompanying drawings.

DESCRIPTION OF THE PREFERRED EMBODIMENT

Figure 6:
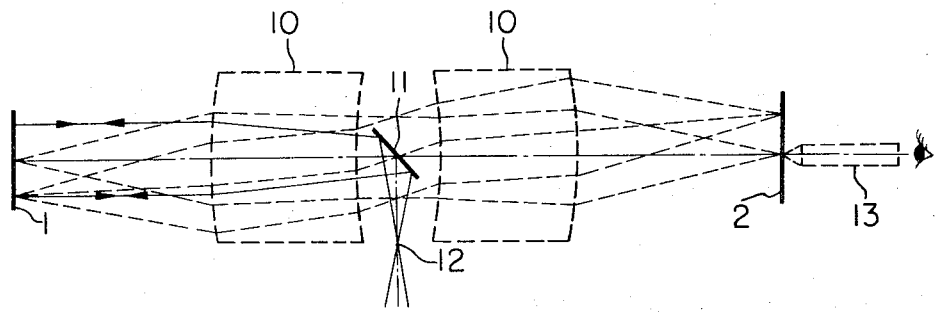
FIG. 6 is a schematic view, partly in block diagram form, of the optical arrangement according to an embodiment of the present invention.

Referring now to FIG. 6, there is shown an embodiment of the optical arrangement according to the present invention. Between a photosensitive plate 1 formed with a photosensitive layer thereon and an original plate 2 formed with a pattern to be printed onto the photosensitive layer of the photosensitive plate, there is interposed a pair of projection lenses 10. A semitransparent mirror 11 is disposed obliquely between the two projection lenses 10 in their optical path. Below the inclined mirror 11 is disposed a light source or an image of light source 12 for adjusting the position of the image to be printed. A position adjusting microscope 13 is disposed behind the original plate 2. The light source or image of light source 12 is positioned at or near a location corresponding to the focal point of the optical system interposed between the photosensitive plate 1 and the semitransparent mirror 11. Thus, according to the illustrated optical arrangement of the present invention, light from the light source or image of light source 12 disposed laterally with respect to the optical axis is directed to the photosensitive plate 1 by the inclined semitransparent mirror 11 disposed in the optical image forming system so that the image projected on the photosensitive plate 1 through one of the projection lenses 10 is superposed on the original plate 2 through the two projection lenses 10 and viewed for position adjustment through the position adjusting microscope 13 disposed behind the original plate.

Figure 1:
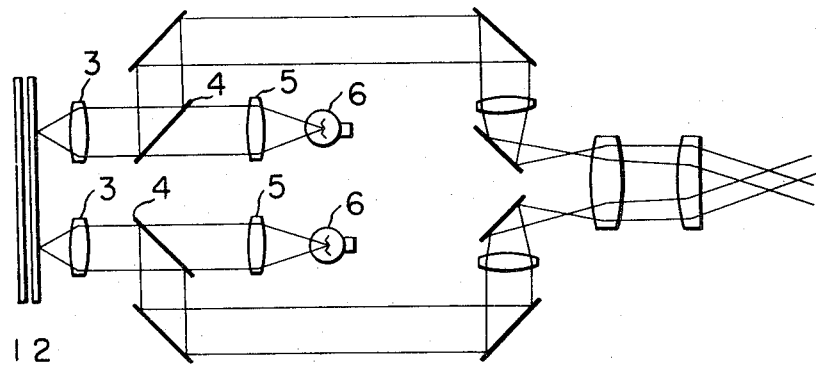
FIG. 1 is a schematic view of an optical arrangement of a microscope for adjusting the position of a photosensitive plate in a contact printing system of the conventional prior art type.
Figure 2:
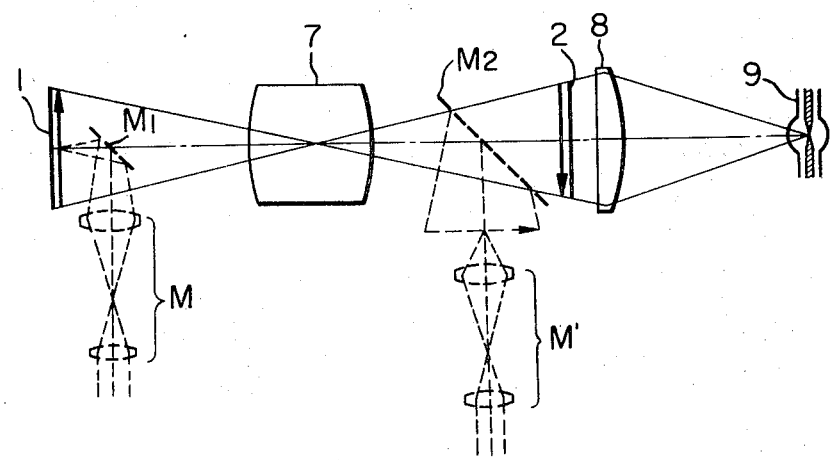
FIG. 2 is a schematic view of an optical arrangement in a projection printing system of the conventional prior art type.
Figure 3:
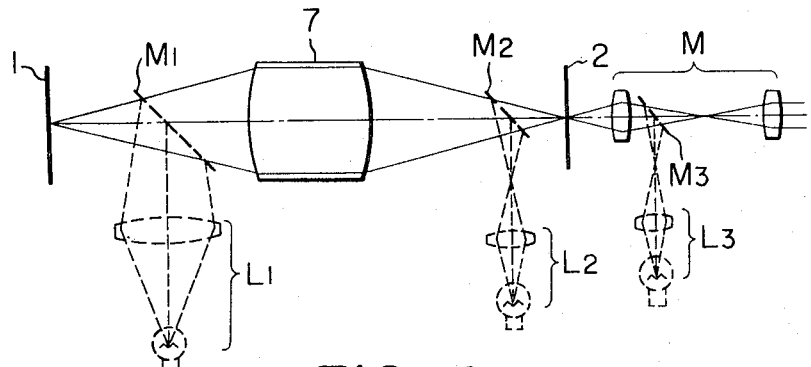
FIG. 3 is a schematic view of another example of an optical arrangement in a conventional prior art projection system having a position adjusting microscope disposed behind the original plate upon which the image of the photosensitive plate is projected through a projection lens, and showing a straight optical path in the optical image forming system.
Figure 4:
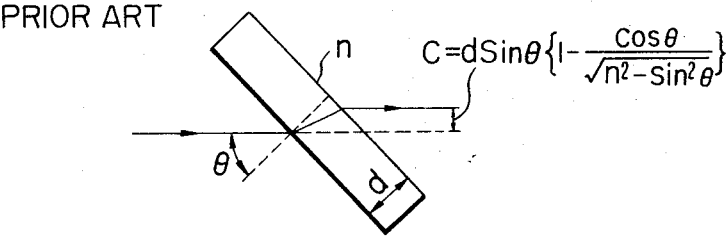
FIG. 4 is a schematic view of the prior art showing the optical path followed by light passing through a plate having parallel flat sides.
Figure 5:
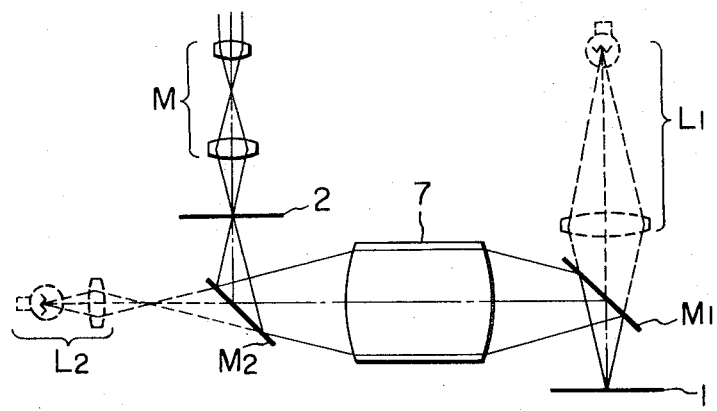
FIG. 5 schematically shows another prior art example of an optical arrangement similar to that of FIG. 3, but different therefrom in that the optical axis of the optical image forming system is non-rectilinear.

Such a viewing system appears to be similar to the system of FIG. 3 in which the optical image forming system has a rectilinear optical path and illuminating light is projected from between the photosensitive plate and the projection lens or between the projection lens and the original plate, but the former is different from the latter in that the semitransparent mirror 11 is disposed at an afocal position in the optical image forming system.

Figure 7:
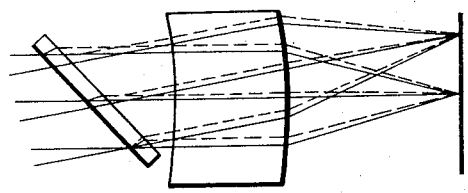
FIG. 7 shows the optical paths followed by afocal light beams as they pass through an inclined plate of parallel flat surfaces and through a lens, and FIGS. 8(a) and (b) illustrate the manner in which a concavo-convex object is visible when they are illuminated through different illuminating systems.

The illuminating system in the illustrated embodiment will now be described as to its operation from two points of view. Firstly, in this embodiment, the semitransparent mirror 11 is obliquely disposed at an afocal position in the optical image forming system so that the illuminating light is thrown laterally with respect to the optical system to illuminate the photosensitive plate 1, as described above. This may be better understood by reference to FIG. 7, which illustrates the manner in which light passes through the semitransparent mirror disposed at the afocal position of the optical image forming system. In FIG. 7, solid lines indicate typical light beams contributing to the image formation when the semitransparent mirror is absent, while broken lines indicate the optical paths when the semitransparent mirror is present. It will be seen that when the semitransparent mirror is disposed at the afocal position, the thickness of that mirror forms no factor which causes deviation of the image plane, shift of the formed image and irregularity of aberrations. Theoretically, the beams resulting form the presence of the semitransparent mirror are parallel beams whose optical path is deviated from that of the beams in the absence of such mirror by an amount given from equation (1), but this will never hamper the performance of the projection lens unless the thickness of the semitransparent mirror is so great that the light beams passed therethrough go beyond the effective aperture of the projection lens.

Figure 8:
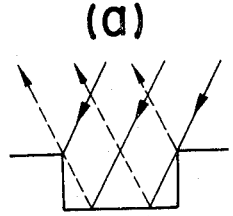
Figure 8:
Figure 8:
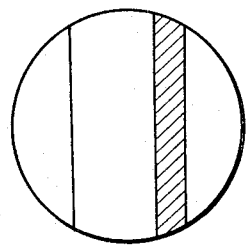
Figure 8:
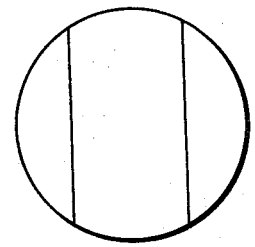

Secondly, the light source or image of light source 12 is disposed at or near the position corresponding to the focal point of the optical system interposed between the photosensitive plate 1 and the semitransparent mirror 11, as was also mentioned above, and therefore the light beams emerging from that optical system are made parallel to the optic axis so that the illuminating light is caused to emerge from the photosensitive plate 1 perpendicularly or substantially perpendicularly thereto. When a concavo-convex object is to be viewed, the surface contour thereof is generally variable with the type of illuminating system in use. Such situation is shown in FIG. 8, where (a) illustrates the optical paths of oblique illuminating rays and their mode of visibility and (b) illustrates the optical path of perpendicular illuminating rays and their mode of visibility. When precise positioning is desired, it is not desirable that the image be seen to be deformed depending upon the shape or orientation of the object. Especially when microscopic accuracy is required in positioning, perpendicular illumination must be effected. With the illustrated embodiment, therefore, no deformation occurs in the image to be viewed and this ensures a precise positional adjustment.

According to the present invention, as has been described hereinbefore, the relative position of the original plate and the photosensitive element in the projection printing system can be adjusted without causing any positional deviation and shift of the formed image and any irregularity of aberrations and, moreover, the adjustment can be made extremely precise because it is effected by using perpendicular illumination without the contrast of the image being reduced due to the reflection of the surface of the original plate. In addition, the photosensitive plate and the original plate are never brought into contact but maintained spaced apart from each other and this protects the photosensitive plate against any damage which would otherwise be imparted thereto, as well as prevents the original plate from being wasted.

We claim:

1. An apparatus for aligning a plate formed with a photosensitive layer thereon and an original plate formed with a pattern to be printed onto the photosensitive layer;

the combination comprising;
 a projection optical system including at least two optical groups and having an afocal position therebetween;
 said photosensitive plate formed with the photosensitive layer thereon being disposed perpendicularly to an optical axis of the projection optical system;
 said original plate formed with the pattern to be printed onto the photosensitive layer being disposed at a conjugate point relative to the photosensitive plate, with respect to the projection optical system;
 a semi-transparent mirror obliquely disposed at the afocal position in said projection optical system;
 a light source disposed substantially at a conjugate point relative to the focal point of one of the optical groups disposed between the semitransparent mirror and the photosensitve plate, with respect to the semitransparent mirror so as to perpendicularly illuminate the photosensitive plate, and
 a microscope for observing the original plate on which the image of the photosensitive plate is formed through the projection optical system.

* * * * *